US011952698B2

(12) United States Patent
Kim et al.

(10) Patent No.: US 11,952,698 B2
(45) Date of Patent: Apr. 9, 2024

(54) LAUNDRY TREATMENT MACHINE

(71) Applicant: LG ELECTRONICS INC., Seoul (KR)

(72) Inventors: Junsung Kim, Seoul (KR); Sungwan Kim, Seoul (KR); Chungill Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 452 days.

(21) Appl. No.: 17/258,289

(22) PCT Filed: Jul. 5, 2019

(86) PCT No.: PCT/KR2019/008283
§ 371 (c)(1),
(2) Date: Jan. 6, 2021

(87) PCT Pub. No.: WO2020/009526
PCT Pub. Date: Jan. 9, 2020

(65) Prior Publication Data
US 2021/0277563 A1  Sep. 9, 2021

(30) Foreign Application Priority Data
Jul. 6, 2018 (KR) .................. 10-2018-0079059

(51) Int. Cl.
*D06F 33/42* (2020.01)
*D06F 34/10* (2020.01)
(Continued)

(52) U.S. Cl.
CPC .............. *D06F 33/42* (2020.02); *D06F 34/14* (2020.02); *D06F 34/10* (2020.02); *D06F 39/085* (2013.01);
(Continued)

(58) Field of Classification Search
CPC .......... D06F 33/42; D06F 34/14; D06F 34/10; D06F 39/085; D06F 2103/18;
(Continued)

(56) References Cited

U.S. PATENT DOCUMENTS 6,257,027 B1    7/2001  Imai
2007/0113595 A1*  5/2007  Harwood .............. D06F 39/087
68/12.01
(Continued)

FOREIGN PATENT DOCUMENTS

CN   1517474     8/2004
CN   103255600   8/2013
(Continued)

OTHER PUBLICATIONS

Chinese Office Action issued in Application No. 201980058169.3 dated Aug. 31, 2022.
(Continued)

*Primary Examiner* — Michael E Barr
*Assistant Examiner* — Pallavi Chitta
(74) *Attorney, Agent, or Firm* — KED & Associates LLP

(57) ABSTRACT

The present disclosure relates to a laundry treatment machine. A laundry treatment machine according to an embodiment of the present disclosure including an inverter to convert the DC voltage from the converter into an alternating current (AC) voltage based on a switching operation and to output the converted AC voltage to the drain motor; and a controller to control the drain motor to operate at any one of a first speed, a second speed less than the first speed, and a stop when the washing tub motor is accelerated. Accordingly, according to the operation of the washing tub motor, it is possible to efficiently drive the drain motor.

15 Claims, 17 Drawing Sheets

(51) Int. Cl.
  *D06F 34/14* (2020.01)
  *D06F 39/08* (2006.01)
  *D06F 103/18* (2020.01)
  *D06F 103/24* (2020.01)
  *D06F 105/08* (2020.01)

(52) U.S. Cl.
  CPC ...... *D06F 2103/18* (2020.02); *D06F 2103/24* (2020.02); *D06F 2105/08* (2020.02)

(58) Field of Classification Search
  CPC .. D06F 2103/24; D06F 2105/08; D06F 33/48; D06F 37/304; F04D 13/06; F04D 15/0066; H02P 29/20
  See application file for complete search history.

(56) References Cited

U.S. PATENT DOCUMENTS

| | | | |
|---|---|---|---|
| 2014/0310884 | A1 | 10/2014 | Kwon et al. |
| 2015/0240404 | A1 | 8/2015 | Kim et al. |
| 2015/0252509 | A1 | 9/2015 | Heo et al. |
| 2019/0127903 | A1* | 5/2019 | Je ........................... D06F 37/12 |

FOREIGN PATENT DOCUMENTS

| | | |
|---|---|---|
| CN | 103852155 | 6/2014 |
| CN | 104911864 | 9/2015 |
| CN | 106048965 | 10/2016 |
| CN | 106811916 | 6/2017 |
| CN | 107304513 | 10/2017 |
| EP | 3235937 | 10/2017 |
| EP | 3291439 | 3/2018 |
| GB | 792758 | 4/1958 |
| JP | 11-276777 A | 10/1999 |
| JP | 2001-276482 | 10/2001 |
| KR | 10-1999-0026926 A | 4/1999 |
| KR | 19990026926 A * | 4/1999 |
| KR | 10-2000-0043385 | 7/2000 |
| KR | 10-2010-0050056 | 5/2010 |
| KR | 10-2011-0013157 | 2/2011 |
| KR | 10-2011-0013172 * | 2/2011 |
| KR | 10-2011-0013172 A | 2/2011 |
| KR | 10-2011-0112486 | 10/2011 |
| KR | 10-1259799 | 4/2013 |
| KR | 10-2014-0124560 A | 10/2014 |
| KR | 10-2015-0099386 A | 8/2015 |
| KR | 10-1756408 | 7/2017 |

OTHER PUBLICATIONS

European Search Report dated Feb. 21, 2022 issued in Application No. 19831129.2.
International Search Report (with English Translation) and Written Opinion dated Oct. 25, 2019 issued in Application No. PCT/KR2019/008283.
Korean Office Action dated Aug. 29, 2022 issued in Application No. 10-2018-0079059.
Chinese Notice of Allowance dated Nov. 10, 2023 issued in Application No. 201980058169.3.

* cited by examiner

LAUNDRY TREATMENT MACHINE

CROSS-REFERENCE TO RELATED PATENT APPLICATIONS

This application is a U.S. National Stage Application under 35 U.S.C. § 371 of PCT Application No. PCT/KR2019/008283, filed Jul. 5, 2019, which claims priority to Korean Patent Application No. 10-2018-0079059, filed Jul. 6, 2018, whose entire disclosures are hereby incorporated by reference.

BACKGROUND OF THE DISCLOSURE

1. Field of the Disclosure

The present disclosure relates to a laundry treatment machine, and more particularly, to a laundry treatment machine capable of efficiently driving a drain motor according to operation of a motor of a washing tub.

Further, the present disclosure relates to a laundry treatment machine capable of smoothly performing drainage during dewatering.

Further, the present disclosure relates to a laundry treatment machine capable of reducing noise or vibration during operation of a drain pump.

Further, the present disclosure relates to a laundry treatment machine capable of driving a drain pump motor in a sensorless manner.

Further, the present disclosure relates to a laundry treatment machine capable of improving the stability of a converter.

Further, the present disclosure relates to a laundry treatment machine capable of shortening a drainage completion period.

2. Description of the Related Art

A drain pump driving apparatus drives a motor during drainage to discharge water introduced into a water introduction part to the outside.

When using an AC pump motor in order to drive a drain pump, the motor is normally driven by a constant speed operation with an input AC voltage.

For example, when a frequency of the input AC voltage is 50 Hz, the motor for the drain pump rotates at 3000 rpm, and when the frequency of the input AC voltage is 60 Hz, the motor for the drain pump rotates at 3600 rpm.

Such an AC pump motor has a drawback such as an extended period of time for completion of drainage because the speed of the motor is not controlled during drainage.

In order to address the drawback, researches are being conducted to apply a DC brushless motor as a drain pump motor.

Examples of a drain pump motor based on a DC brushless motor are disclosed in Japanese Patent Laid-Open Publication Nos. 2001-276485 and 2002-166090.

In the prior documents, there is a drawback such as an extended period of time for completion of drainage during drainage because speed control is performed when the drain pump motor is controlled.

In addition, these prior documents merely disclose that the speed control is performed at the time of controlling the drain pump motor, without disclosing a method of efficiently driving a drain motor according to the operation of a washing tub motor during dewatering. In addition, a solution to noise or vibration that occurs when a pressure in a vortex chamber of the drain pump increases is not disclosed.

SUMMARY

The present disclosure provides a laundry treatment machine capable of reducing the pressure in a vortex chamber of a drain pump during dewatering.

Further, the present disclosure provides a laundry treatment machine capable of smoothly performing drainage during dewatering.

Further, the present disclosure provides a laundry treatment machine capable of reducing noise or vibration during operation of a drain pump.

Further, the present disclosure provides a laundry treatment machine capable of driving a drain pump motor in a sensorless manner.

Further, the present disclosure provides a laundry treatment machine capable of improving the stability of a converter.

Further, the present disclosure provides a laundry treatment machine capable of shortening a drainage completion period.

An embodiment of the present disclosure provides a laundry treatment machine including an inverter to convert the DC voltage from the converter into an alternating current (AC) voltage based on a switching operation and to output the converted AC voltage to the drain motor; and a controller to control the drain motor to operate at any one of a first speed, a second speed less than the first speed, and a stop when the washing tub motor is accelerated.

In the laundry treatment machine according to an embodiment of the present disclosure, the controller may control the drain motor to rotate at the first speed when the washing tub motor is accelerated, and then to rotate at the second speed after a predetermined time.

In the laundry treatment machine according to an embodiment of the present disclosure, the main controller may control the drain motor to rotate at the second speed when the washing tub motor is accelerated and then to stop when a water level in the washing tub is a zero water level.

In the laundry treatment machine according to an embodiment of the present disclosure, the main controller may control the drain motor to rotate at the first speed, the second speed, and a third speed less than a second speed before the washing tub motor is accelerated.

In the laundry treatment machine according to an embodiment of the present disclosure, the main controller may control the drain motor to rotate at the first speed, the second speed, and a third speed less than a second speed before the washing tub motor is accelerated.

In the laundry treatment machine according to an embodiment of the present disclosure, when a water level in the washing tub decreases before the washing tub motor is accelerated, the controller may control the drain motor to be gradually decreased to the first speed, the second speed, and the third speed.

In the laundry treatment machine according to an embodiment of the present disclosure, when a speed of the washing tub motor is less than a first reference speed before the washing tub motor is accelerated, the controller may control the drain motor to rotate at the first speed, the second speed, and a third speed less than the first speed.

In the laundry treatment machine according to an embodiment of the present disclosure, after the acceleration of the washing tub motor, the controller may perform control such that the drain motor repeatedly turns on and off.

In the laundry treatment machine according to an embodiment of the present disclosure, when the a speed of the washing tub motor exceeds a second reference speed after the acceleration of the washing tub motor, the controller may perform control such that the drain motor repeatedly turns on and off.

In the laundry treatment machine according to an embodiment of the present disclosure, the controller may set the first reference speed to correspond to a laundry attachment speed in the washing tub.

Another embodiment of the present disclosure provides a laundry treatment machine including: an inverter to convert the DC voltage from the converter into an alternating current (AC) voltage based on a switching operation and to output the converted AC voltage to the drain motor; and a controller to control the drain motor to operate in a first mode operating at a plurality of speeds before the washing tub motor is accelerated, and to operate in a second mode operating at a plurality of speeds when the washing tub motor is accelerated. A type of speed in the first is greater than a type of speed in the second mode.

Advantageous Effects

According to an embodiment of the present disclosure, there is provided a laundry treatment machine including an inverter to convert the DC voltage from the converter into an alternating current (AC) voltage based on a switching operation and to output the converted AC voltage to the drain motor; and a controller to control the drain motor to operate at any one of a first speed, a second speed less than the first speed, and a stop when the washing tub motor is accelerated. Accordingly, according to the operation of the washing tub motor, it is possible to efficiently drive the drain motor. Therefore, drainage can be smoothly performed while reducing the pressure in the vortex chamber of the drain pump. Accordingly, noise or vibration caused by the operation of the drain pump can be reduced.

In the laundry treatment machine according to an embodiment of the present disclosure, the controller may control the drain motor to rotate at the first speed when the washing tub motor is accelerated, and then to rotate at the second speed after a predetermined time. Accordingly, according to the operation of the washing tub motor, it is possible to efficiently drive the drain motor.

In the laundry treatment machine according to an embodiment of the present disclosure, the main controller may control the drain motor to rotate at the second speed when the washing tub motor is accelerated and then to stop when a water level in the washing tub is a zero water level. Accordingly, according to the operation of the washing tub motor, it is possible to efficiently drive the drain motor.

In the laundry treatment machine according to an embodiment of the present disclosure, the main controller may control the drain motor to rotate at the first speed, the second speed, and a third speed less than a second speed before the washing tub motor is accelerated. Accordingly, according to the operation of the washing tub motor, while efficiently driving the drain motor, drainage can be smoothly performed.

In the laundry treatment machine according to an embodiment of the present disclosure, the main controller may control the drain motor to rotate at the first speed, the second speed, and a third speed less than a second speed before the washing tub motor is accelerated. Accordingly, according to the operation of the washing tub motor, while efficiently driving the drain motor, drainage can be smoothly performed.

In the laundry treatment machine according to an embodiment of the present disclosure, when a water level in the washing tub decreases before the washing tub motor is accelerated, the controller may control the drain motor to be gradually decreased to the first speed, the second speed, and the third speed. Accordingly, according to the operation of the washing tub motor, while efficiently driving the drain motor, drainage can be smoothly performed.

In the laundry treatment machine according to an embodiment of the present disclosure, when a speed of the washing tub motor is less than a first reference speed before the washing tub motor is accelerated, the controller may control the drain motor to rotate at the first speed, the second speed, and a third speed less than the first speed. Accordingly, according to the operation of the washing tub motor, while efficiently driving the drain motor, drainage can be smoothly performed.

In the laundry treatment machine according to an embodiment of the present disclosure, after the acceleration of the washing tub motor, the controller may perform control such that the drain motor repeatedly turns on and off. Accordingly, according to the operation of the washing tub motor, while efficiently driving the drain motor, drainage can be smoothly performed.

In the laundry treatment machine according to an embodiment of the present disclosure, when the a speed of the washing tub motor exceeds a second reference speed after the acceleration of the washing tub motor, the controller may perform control such that the drain motor repeatedly turns on and off. Accordingly, according to the operation of the washing tub motor, while efficiently driving the drain motor, drainage can be smoothly performed.

In the laundry treatment machine according to an embodiment of the present disclosure, the controller may set the first reference speed to correspond to a laundry attachment speed in the washing tub. Accordingly, according to the operation of the washing tub motor, while efficiently driving the drain motor, drainage can be smoothly performed.

According to another embodiment of the present disclosure, there is provided a laundry treatment machine including: an inverter to convert the DC voltage from the converter into an alternating current (AC) voltage based on a switching operation and to output the converted AC voltage to the drain motor; and a controller to control the drain motor to operate in a first mode operating at a plurality of speeds before the washing tub motor is accelerated, and to operate in a second mode operating at a plurality of speeds when the washing tub motor is accelerated. A type of speed in the first is greater than a type of speed in the second mode. Accordingly, according to the operation of the washing tub motor, while efficiently driving the drain motor, drainage can be smoothly performed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
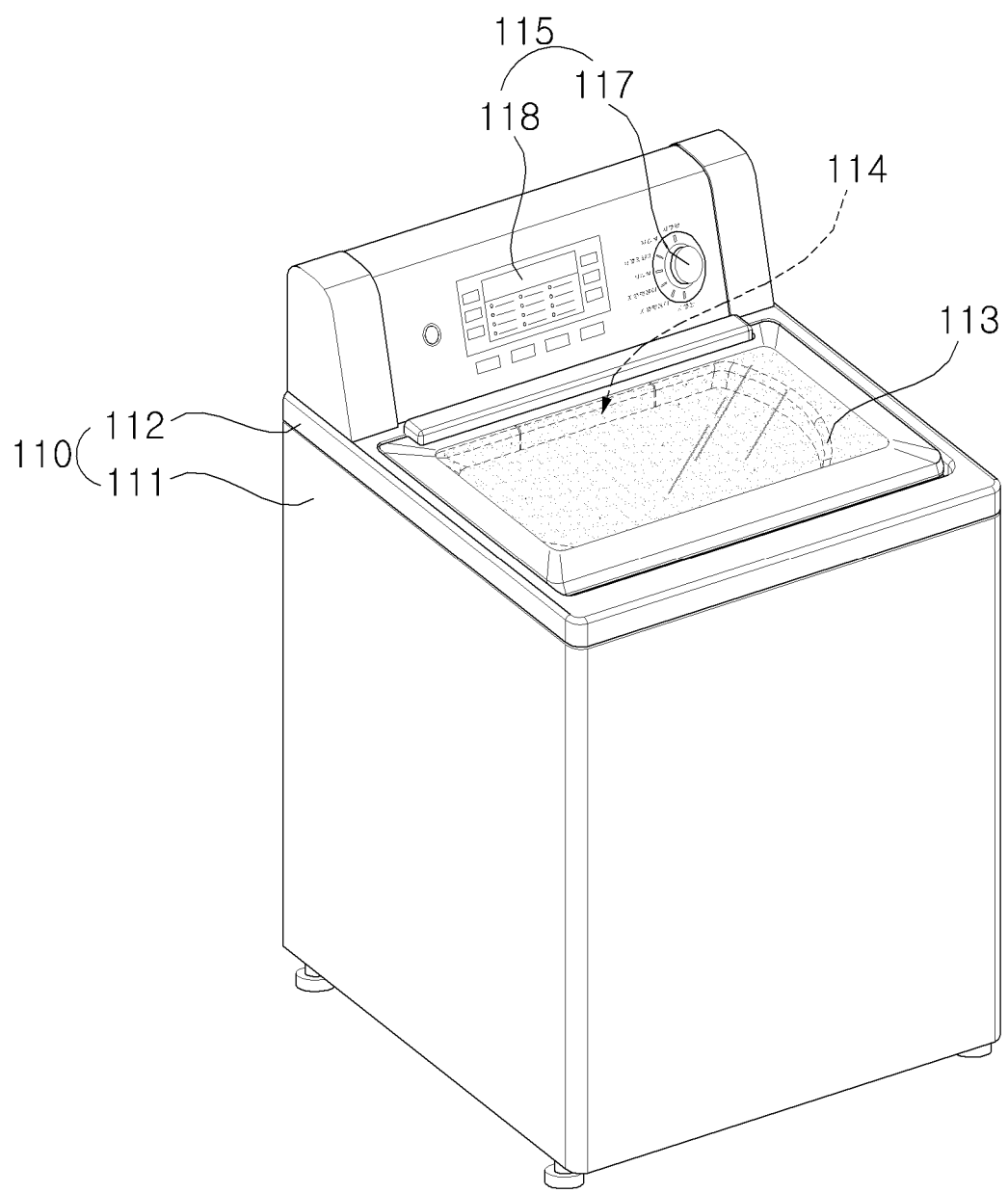
FIG. 1 is a perspective view illustrating a laundry treatment machine according to an embodiment of the present disclosure.
Figure 2:
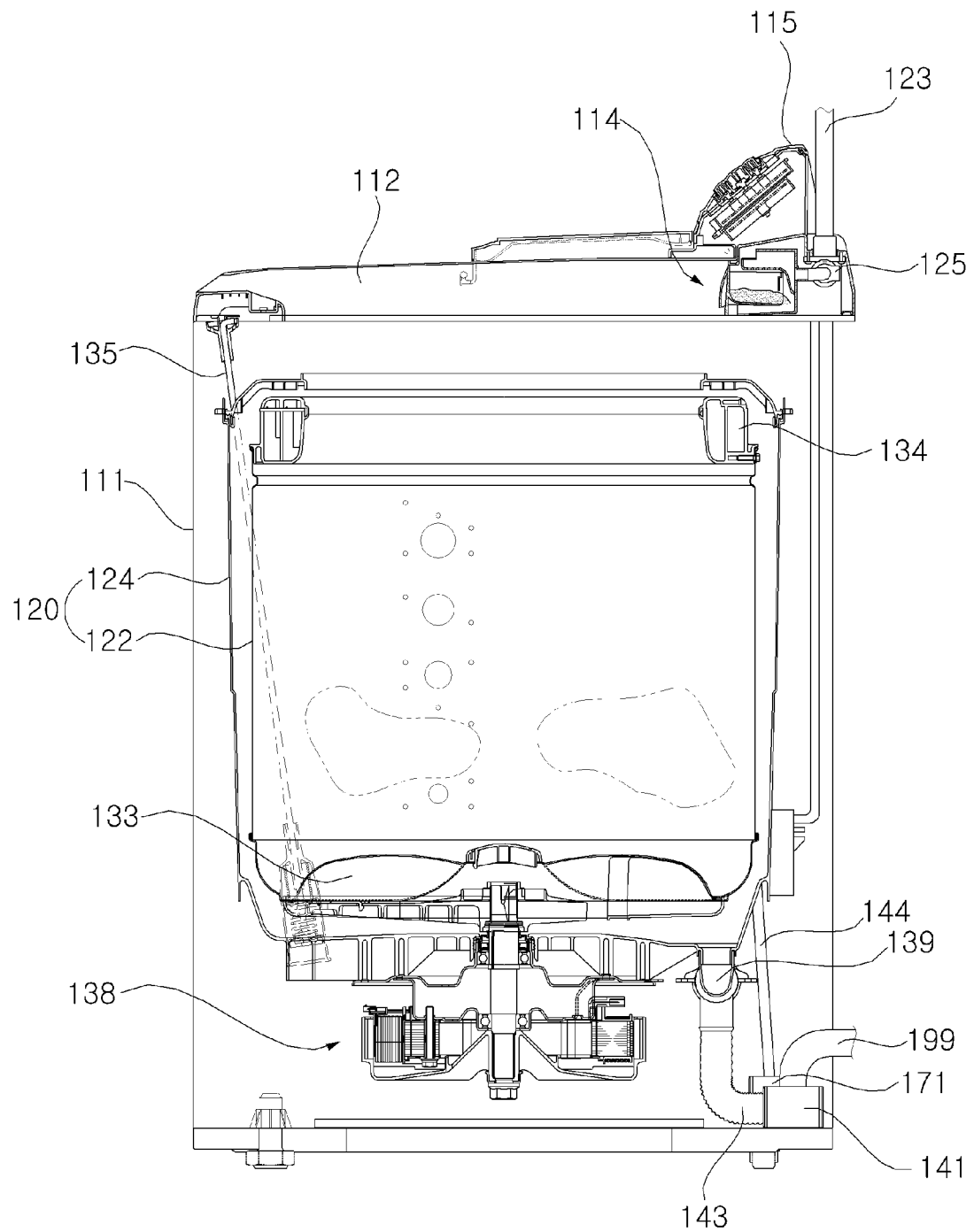
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 (not shown) disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
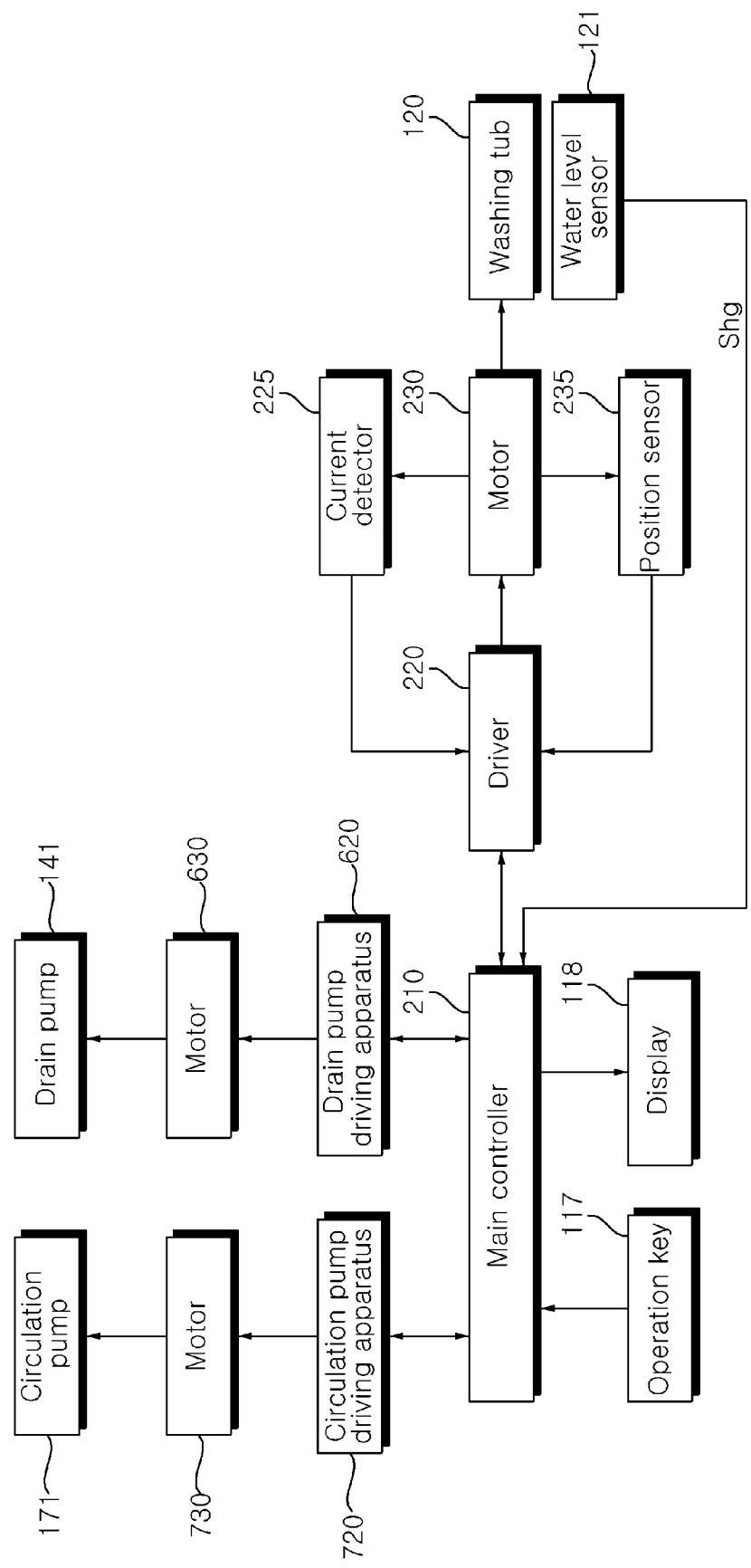
FIG. 3 is an internal block diagram of the laundry treatment machine of FIG. 1.

The driving apparatus 138 is operated by a driving unit 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 139 for regulating the drain channel 143 and a drain pump 141 for pumping the wash water may be provided.

Moreover, a circulation pump 171 for pumping wash water may be provided on an end of the drain channel 143. The wash water pumped by the circulation pump 171 may be introduced into a washing tub 120 through a circulation channel 144.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount contained in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driving unit 220 is controlled by the main controller 210, and the driving unit 220 drives the motor 230. Thereby, the washing tub 120 is rotated by the motor 230.

Meanwhile, the laundry treatment machine 100 may include a drain motor 630 for driving the drain pump 141 and a drain pump driving apparatus 620 for driving the drain motor 630. The drain pump driving apparatus 620 may be controlled by the main controller 210.

Meanwhile, the laundry treatment machine 100 may include a motor 730 for driving the circulation pump 171 and a circulation pump driving apparatus 720 for driving the motor 730. The circulation pump driving apparatus 720 may be controlled by the main controller 210.

In this specification, the drain pump driving apparatus 620 may be referred to as a drain pump driving unit.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driving unit 220 to operate the motor 230. For example, the main controller 210 may control the driving unit 220 to rotate the motor 230, based on a current detector 225 for detecting an output current flowing in the motor 230 and a position sensor 235 for sensing a position of the motor 230. While it is illustrated in FIG. 3 that the detected current and the sensed position signal are input to the driving unit 220, embodiments of the present disclosure are not limited thereto. The detected current and the sensed position signal may be input to the main controller 210 or to both the main controller 210 and the driving unit 220.

The driving unit 220, which serves to drive the motor 230, may include an inverter (not shown) and an inverter controller (not shown). In addition, the driving unit 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
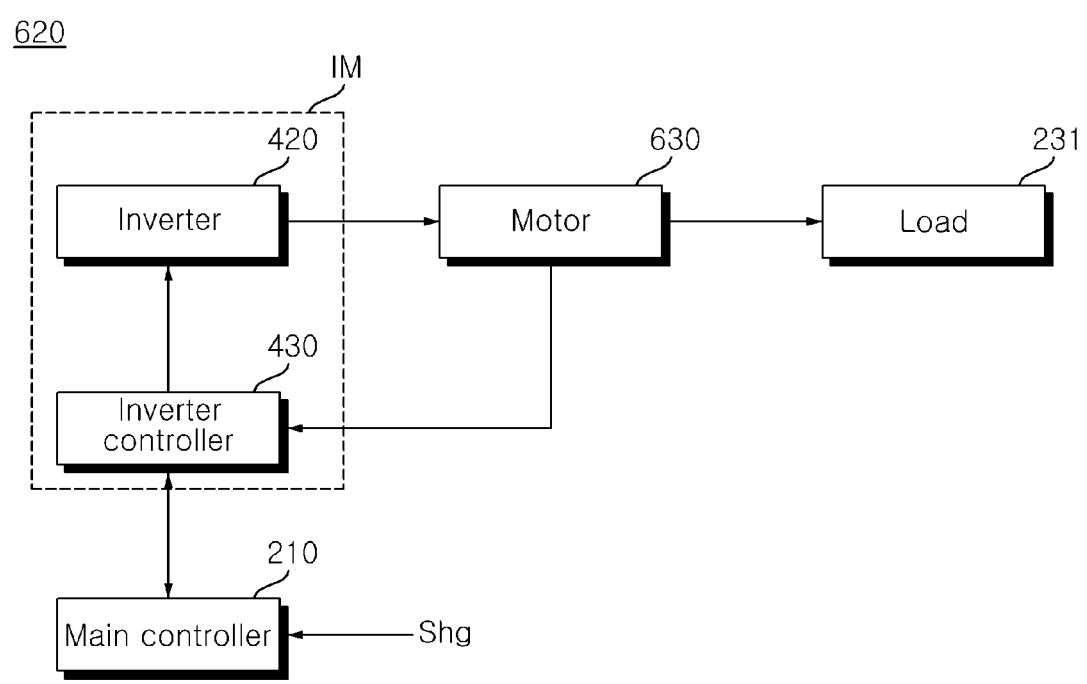
FIG. 4 illustrates an example of an internal block diagram of a drain pump driving apparatus of FIG. 1.
Figure 5:
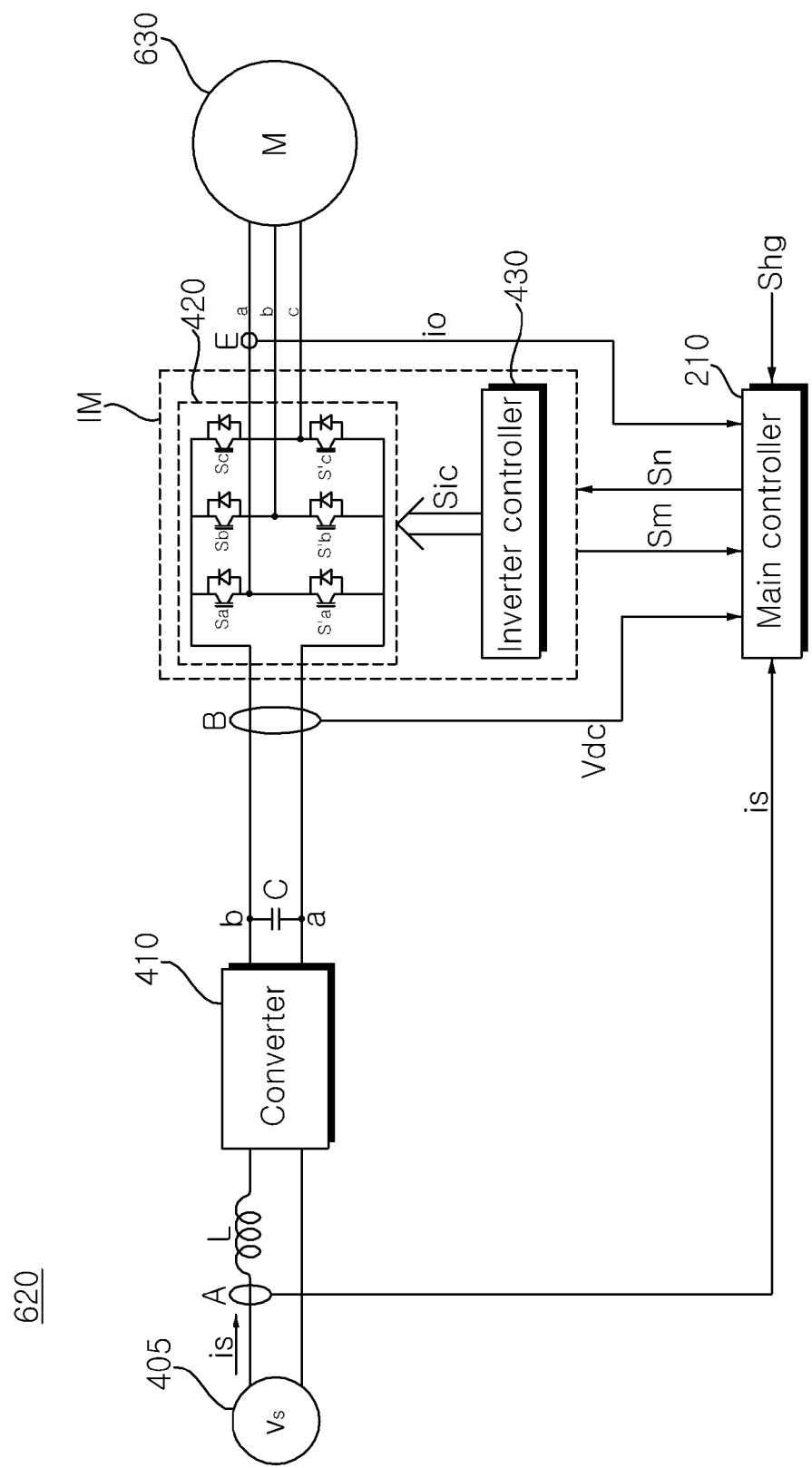
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the drain motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is input from the commercial AC voltage source 405. To this end, a current transformer (CT), a shunt resistor, or the like may be used as the input current detector A. The detected input current is may be input to the inverter controller 430 or the main controller 210 as a discrete signal in the form of a pulse. In FIG. 5, it is illustrated that the detected output current idc is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies depending on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected output current idc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the drain motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current io detected by the output current detector E and a DC terminal voltage Vdc detected by the DC terminal voltage detector B.

The main controller 210 may calculate a power based on the output current io and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current io flowing in the 3-phase motor 630.

The output current detector E may be disposed between the 3-phase drain motor 630 and the inverter 420 to detect an output current io flowing in the motor. In the drawing, it is illustrated that the a-phase current is detected, out of the phase current ia, ib, and ic which is the output current io flowing in the drain motor 630.

Meanwhile, as opposed to the drawing, the output current detector E may be disposed between the DC terminal capacitor C and the inverter 420 and sequentially detect the output current flowing in the motor. In this case, one shunt resistance element Rs may be used, and the phase current ia, ib, and ic flowing in the drain motor 630 may be detected in a time-division manner.

The detected output current io may be input to the inverter controller 430 or the main controller 210 as a discrete signal in the form of a pulse. In FIG. 5, it is illustrated that the detected output current idc is input to the main controller 210.

The 3-phase motor 630 includes a stator and a rotor. The rotor rotates when the AC voltage at a predetermined frequency for each phase is applied to a coil of the stator for each phase (phase a, b or c).

Such a motor 630 may include a brushless DC (BLDC) motor.

the drain motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
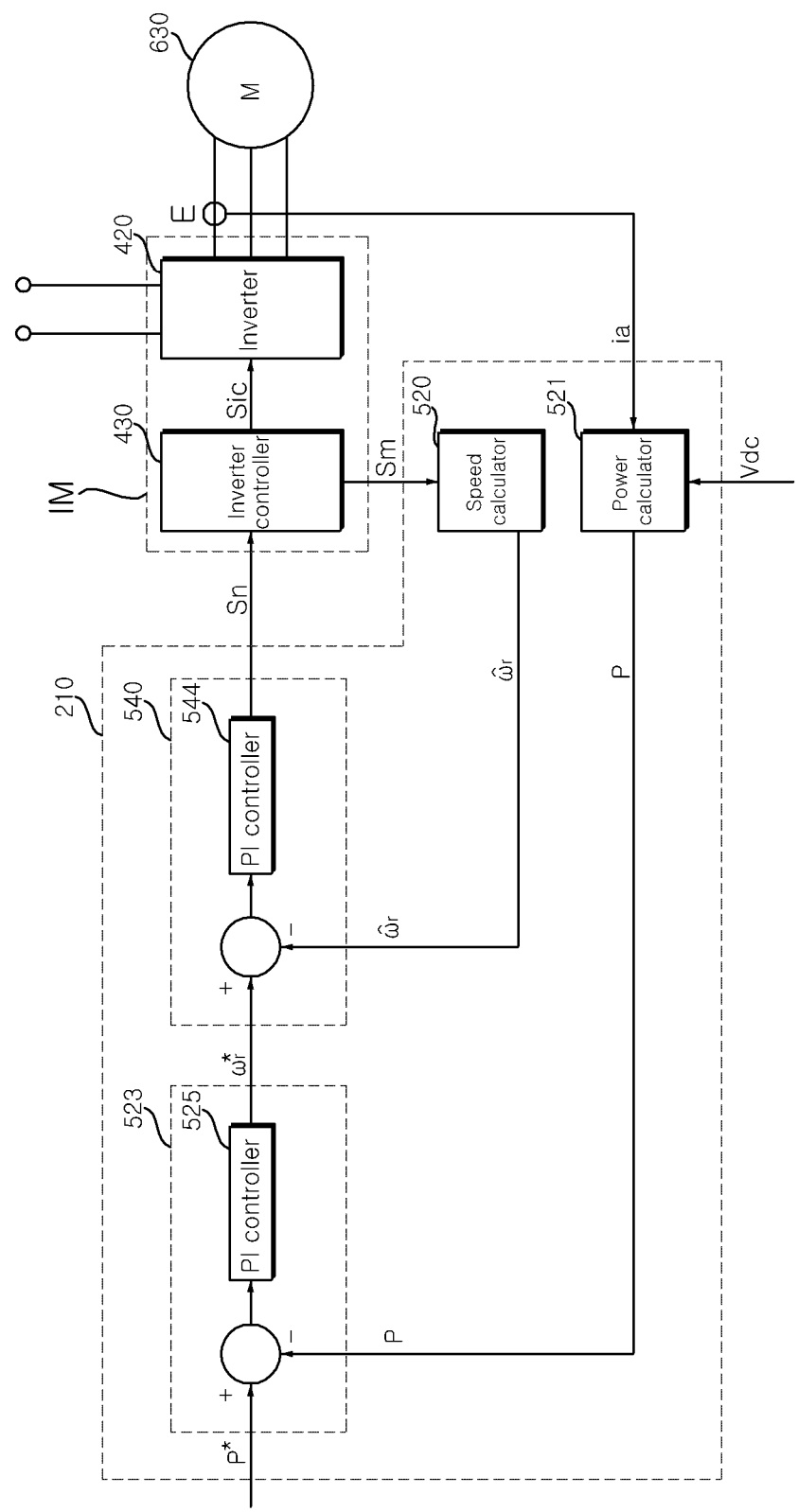
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the drain motor 630 received from the inverter controller 430.

Specifically, the speed calculator 520 may calculate a zero crossing for the voltage information Sm of the drain motor 630 received from the inverter controller 430, and calculate a speed of the drain motor 630 based on the zero crossing.

The power calculator 521 may calculate a power P supplied to the drain motor 630, based on the output current idc detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driving unit (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, during drainage, the main controller 210 according to the embodiment of the present disclosure may control the power supplied to the drain motor 630 to be constant without decreasing over time. Accordingly, a drainage time can be shortened.

Meanwhile, the main controller 210 according to the embodiment of the present disclosure may perform power control on the drain motor 630 at the start of drainage, and, when the remainder of the water is reached, may finish the power control. Accordingly, the drainage operation can be efficiently performed.

The main controller 210 according to an embodiment of the present disclosure may control the voltage command value Sn and a duty of the switching control signal Sic to be greater as the output current io is at a smaller level. Accordingly, the drain motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may be configured to increase the speed of the drain motor 630 during the drainage when the power supplied to the drain motor 630 does not reach the first power and to decrease the speed of the drain motor 630 when the power supplied to the drain motor 630 exceeds the first power.

Meanwhile, the main controller 210 according to the embodiment of the present disclosure may control the speed of the drain motor 630 to be constant, when the power supplied to the drain motor 630 reaches the first power.

Since the power control allows for driving at constant power as described above, the converter 410 supplies constant power, thereby improving the stability of the converter 410. In addition, since the power control is performed, it is possible to minimize a decrease in drainage performance according to installation conditions.

In addition, the drain motor 630 can be driven stably, and furthermore, the drainage time can be shortened.

Figure 7:
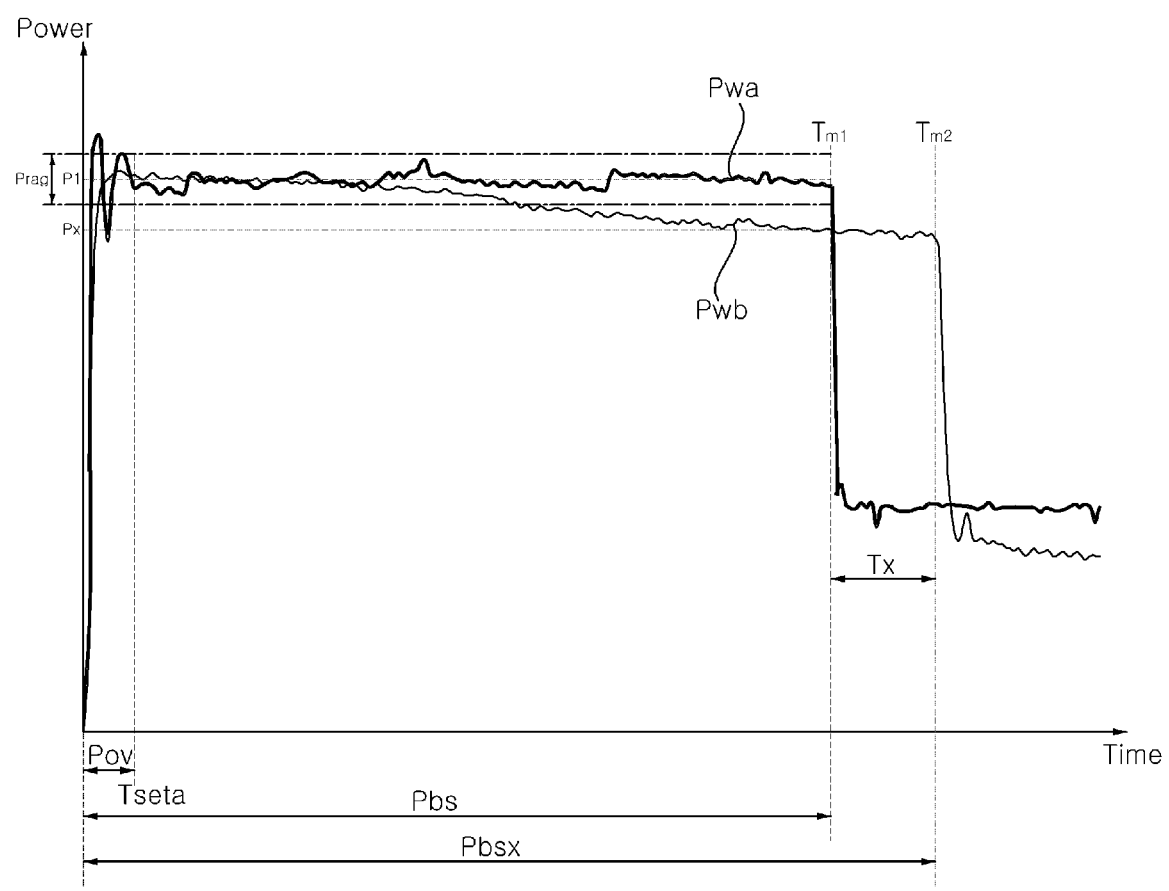
FIG. 7 is a view showing power supplied to a motor according to power control and speed control.

FIG. 7 is a view showing power supplied to a motor according to power control and speed control.

When the power control is performed as in the embodiments of the present disclosure, a time-dependent waveform of the power supplied to the drain motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the drain motor 630, during the drainage, to be constant without decreasing over time, although the water level in the washing tub 120 decreases.

By performing the power control, the main controller 210 may control the power supplied to the drain motor 630, during the drainage, to be the first power P1.

In particular, even if the lift is changed, the main controller 210 may control the power supplied to the drain motor 630, during the drainage, to be the constant first power P1, by performing the power control.

At this time, the constant first power P1 may mean that the drain motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the drain motor 630 is driven with a power within the first allowable range Prag based on the first power P1 from time point Tseta until time point Tm1 when the drainage is completed, excluding an overshooting period Pov. Accordingly, water pumping can be performed smoothly even if the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a reference level Iref, the main controller 210 may control the drain motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the drain motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current io and the DC terminal voltage Vdc and output a voltage command value Sn based on the calculated power, and the inverter controller 430 may output a switching control signal Sic to the drain motor 630 based on the voltage command value Sn.

Meanwhile, the main controller 210 may control the voltage command value Sn and a duty of the switching control signal Sic to be greater as the output current io is at a smaller level. Accordingly, the drain motor 630 can be driven with a constant power.

Meanwhile, the main controller 210 may control the power supplied to the drain motor 630 to increase abruptly during a period PoV to perform power control.

Meanwhile, the main controller 210 may control the power supplied to the drain motor 630 to decrease abruptly from the time point Tm1.

Unlike the embodiments of the present disclosure, when the speed control is performed, that is, when the speed of the drain motor 630 is controlled to be maintained constantly, a time-dependent waveform of the power supplied to the drain motor 630 may be exemplified as Pwb.

In FIG. 7, it is illustrated that the speed control is performed until time point Tm2, and the speed control is terminated at time point Tm2.

The waveform Pwb of the power based on the speed control indicates that the power supplied to the drain motor 630 may be gradually reduced, while the speed of the drain motor 630 is constant, as the water level in the washing tub decreases during the drainage.

In FIG. 7, it is illustrated that, during a speed control period Pbsx, the power supplied to the drain motor 630 is gradually reduced up to approximately Px at time point Tm2 when the drainage is completed.

Accordingly, the time when the operation of the drain motor 630 is terminated in a case where the speed control is performed is Tm2, which is delayed by approximately period Tx, when compared to that in a case where the power control is performed.

Consequently, according to the embodiments of the present disclosure, since the power control is performed during the drainage, the drainage time can be shortened by approximately period Tx, when compared to that in the case where the speed control is performed. In addition, the power supplied from the converter 410 can be kept constant, thereby improving the operation stability of the converter 410.

Figure 8:
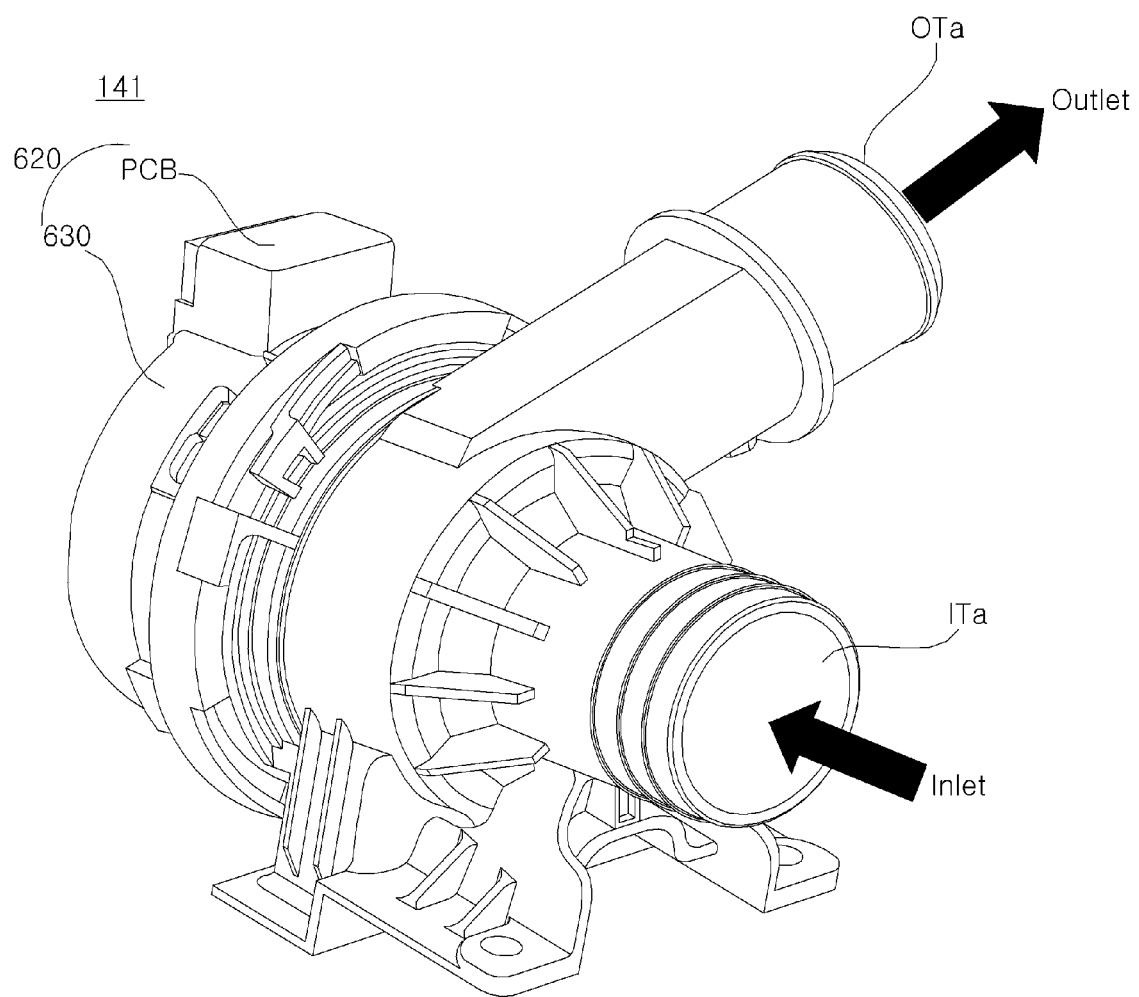
FIGS. 8 and 9 are views illustrating the outer appearance of a drain pump driving apparatus according to an embodiment of the present disclosure.
Figure 9:
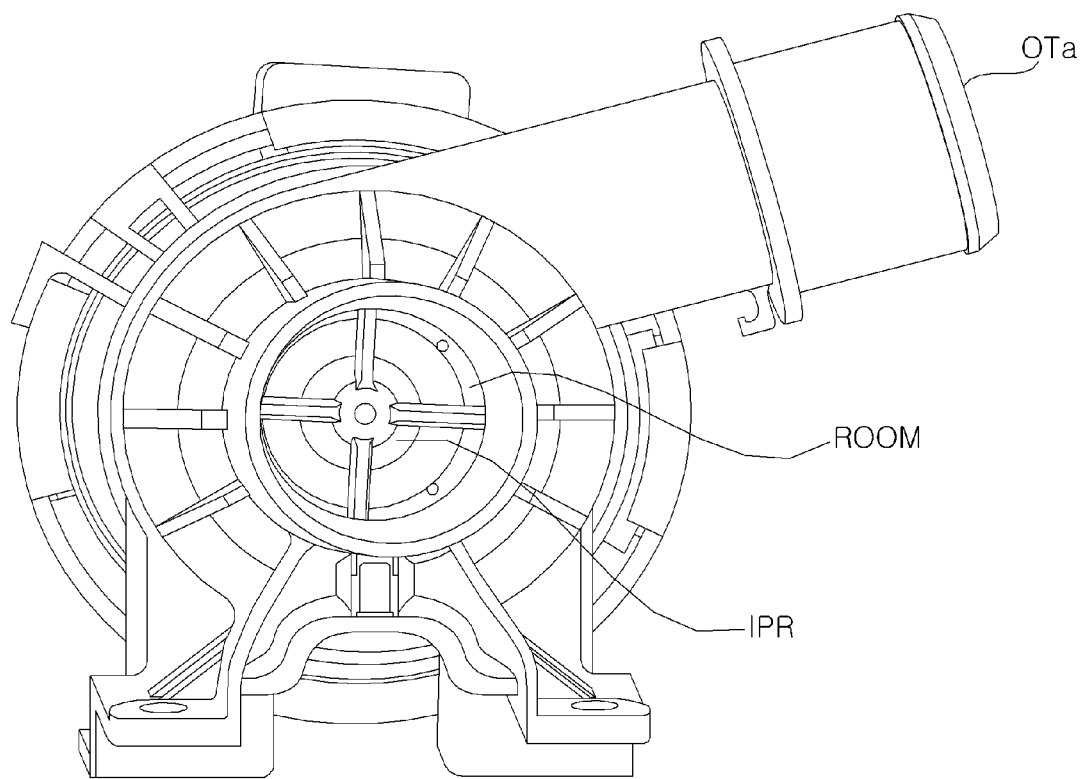

FIGS. 8 and 9 are views illustrating the outer appearance of a drain pump driving apparatus according to an embodiment of the present disclosure.

Referring to FIGS. 8 and 9, wash water is drained through the drain channel 143 connected to the outer tub 124, and the drain channel 143 is connected to a water introduction part ITa of the drain pump 141.

The water introduction part ITa is formed of a hollow tube, and a vortex chamber ROOM with a larger diameter than that of the water introduction part ITa is formed within the water introduction part ITa.

An impeller IPR which rotates by the torque of the drain motor 630 is disposed in the vortex chamber ROOM.

Meanwhile, the drain motor 630 and a circuit board PCB for applying an electrical signal to the drain motor 630 may be disposed on the opposite side of the water introduction part ITa relative to the impeller IPR. The above-described drain pump driving apparatus 220 may be mounted on the circuit board PCB.

Meanwhile, a water discharge part OTa for discharging water may be disposed on one side of the vortex chamber ROOM, in a direction intersecting the water introduction part ITa. In this case, the water discharge part OTa may be connected to a drain pipe 199.

Particularly, the water discharge part OTa may be formed in a direction normal to the vortex chamber ROOM, for smooth drainage. Such a structure of the drain pump 141 may be called a volute-type drain pump structure.

In the case of such a volute-type drain pump structure, the water discharge part OTa is formed on one side of the vortex chamber ROOM. Thus, it is desirable that the drain motor 630 rotates counterclockwise CCW relative to FIG. 9.

Meanwhile, as described above, since the drain pipe 199 is positioned higher than the drain pump 141, the water discharge part OTa may be sloped in the direction of the drain pipe 199.

Similarly, the water introduction part ITa also may be sloped, and the angle of slope of the water introduction part ITa to the ground may be smaller than the angle of slope of the water discharge part OTa to the ground. Therefore, water is introduced more smoothly into the water introduction part ITa, and the water in the vortex chamber ROOM is discharged through the water discharge part OTa by means or the impeller IPR which rotates by the torque of the drain motor 630.

Figure 10A:
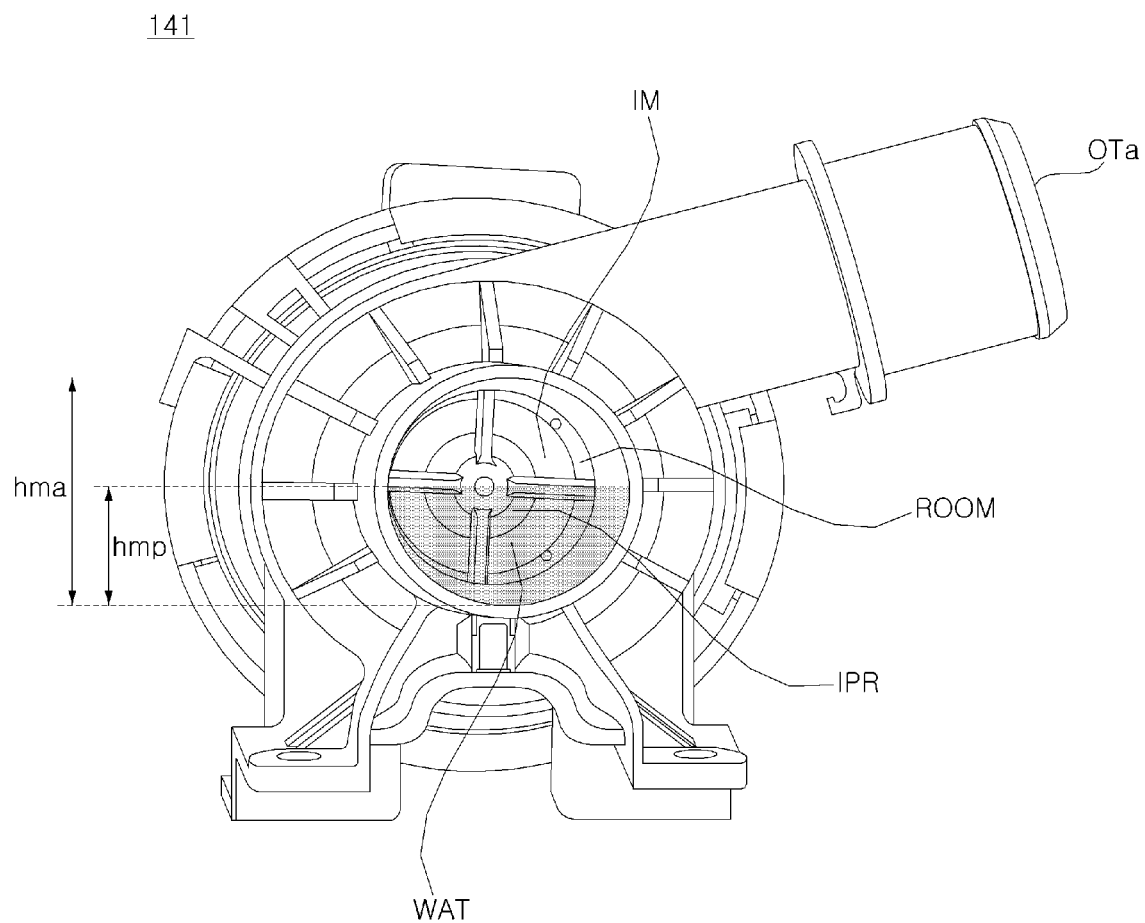
FIGS. 10A and 10B are views illustrating the amount of wash water flowing into a vortex chamber of a drain pump.
Figure 10B:
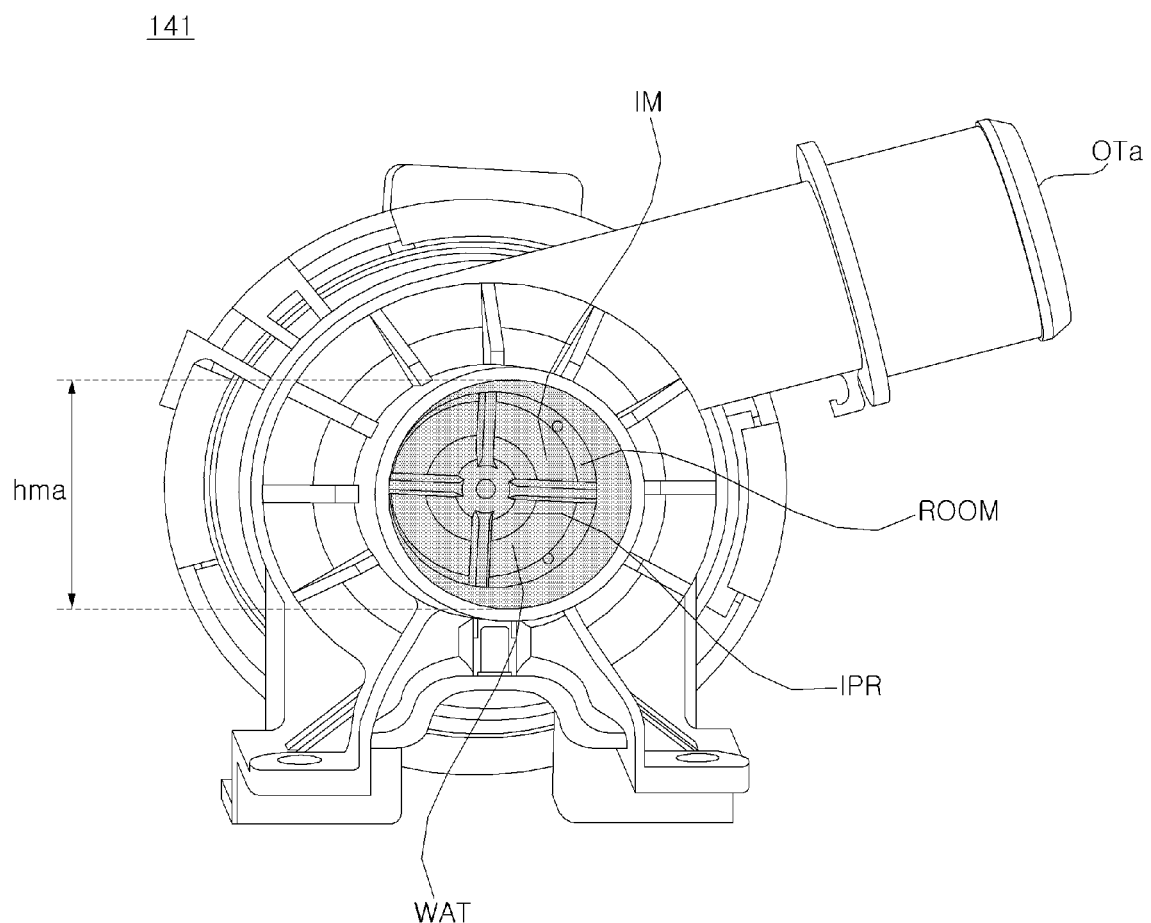

FIGS. 10A and 10B are views illustrating the amount of wash water flowing into a vortex chamber of a drain pump.

FIG. 10A illustrates a case where only a part of wash water WAT flows into the vortex chamber ROOM, and FIG. 10B illustrates a case where the wash water WAT flowing into the vortex chamber ROOM is full, that is, the vortex chamber ROOM is fully filled with the wash water WAT.

As illustrated in FIG. 10B, when the wash water WAT flowing into the vortex chamber ROOM is full, the pressure inside the vortex chamber ROOM does not increase significantly, and the impeller IPR rotates clockwise CW by the torque of the drain motor 630, so that drainage can be smoothly performed through the water discharge part OTa.

However, as illustrated in FIG. 10A, when only a part of the wash water WAT flows into the vortex chamber ROOM, the pressure inside the vortex chamber ROOM is greatly increased. Accordingly, the rotational speed of the drain motor 630 rises to a first speed, which is a limit speed, and the level of the output current io flowing through the drain motor 630 drops to the reference level Iref or less.

Then, due to the increase in pressure inside the vortex chamber ROOM, despite the operation of the drain motor 630, the drainage is not smoothly performed. In addition, when the drain motor 630 is operated, only a part of the wash water WAT is present in the vortex chamber ROOM, so that noise and vibration are generated due to the air present in the vortex chamber ROOM.

Thus, in the present disclosure, a method of reducing the pressure increase inside the vortex chamber ROOM, and also a method of reducing noise and vibration during operation of the drain pump are proposed. In particular, according to the operation of the washing tub motor 230, a method of efficiently driving the drain motor 630 is proposed. This method will be described with reference to FIG. 11 and the subsequent drawings.

Figure 11:
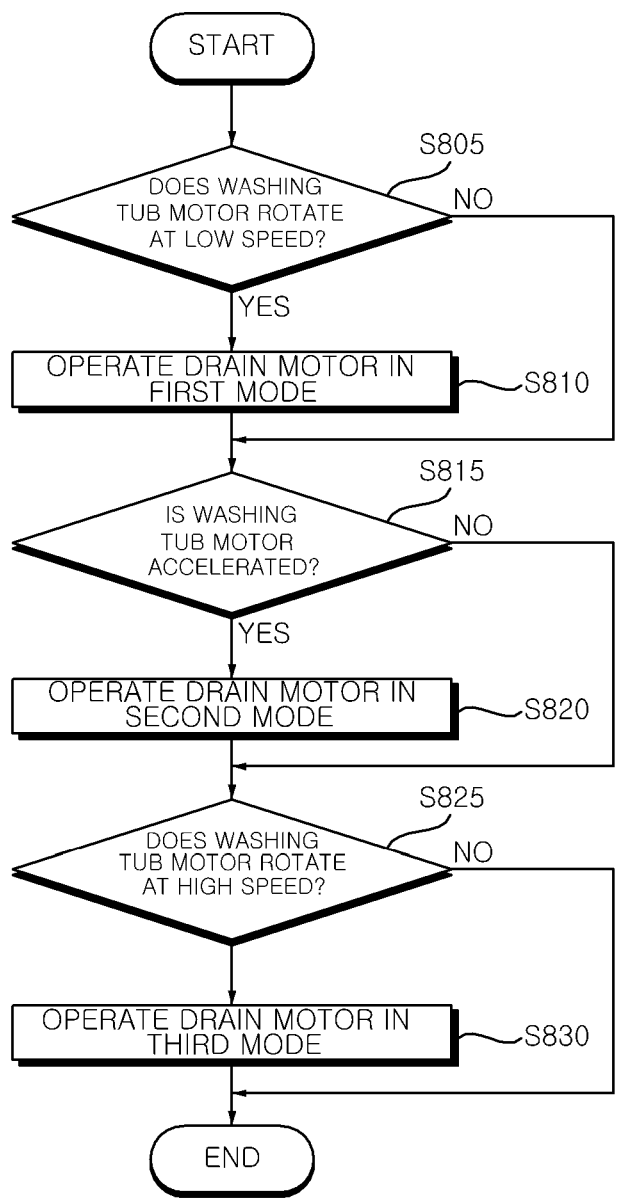
FIG. 11 is a flowchart illustrating an operation method for a laundry treatment machine according to an embodiment of the present disclosure.
Figure 12:
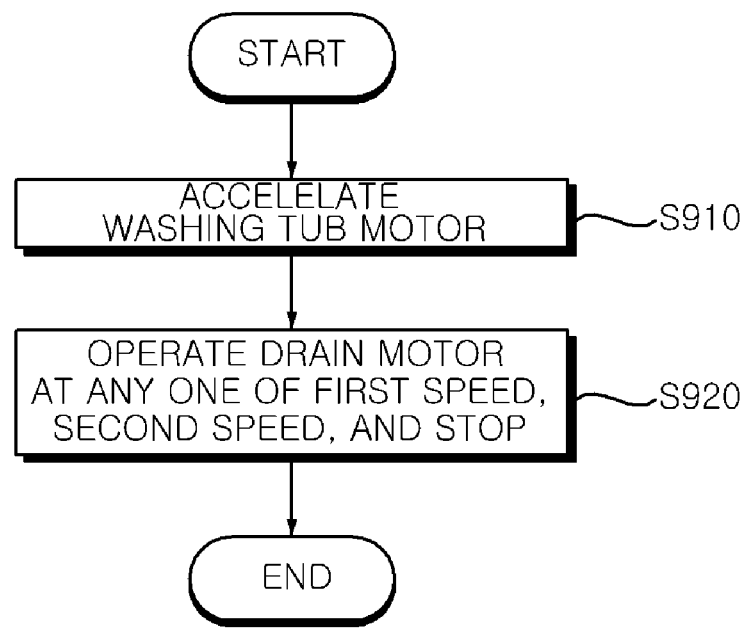
FIGS. 12 to 14C are views referred to in the description of the operation of FIG. 11.

FIG. 11 is a flowchart illustrating an operation method for a laundry treatment machine according to an embodiment of the present disclosure, and FIGS. 12 to 14C are views referred to in the description of the operation method of FIG. 11.

Referring to FIG. 11, the main controller 210 starts dewatering. To this end, the main controller 210 rotates the washing tub motor 230 for dewatering.

Here, the dewatering may be performed in each of the washing, rinsing and dewatering processes. For example, the dewatering may be performed during the washing process, during the rinsing process, and during the dewatering process.

During dewatering, the drainage may be performed, and accordingly, the main controller 210 may control the drain motor 630 to operate.

Next, the main controller 210 determines whether the washing tub motor 230 rotates at a low speed (S805).

For example, when the washing tub motor 230 is less than a first reference speed Wa, the main controller 210 may determine that it is a low speed.

Meanwhile, the main controller 210 may set the first reference speed Wa to correspond to a laundry attachment speed in the washing tub 120. For example, the first reference speed Wa may be 150 rpm.

Next, when the washing tub motor 230 rotates at a low speed, the main controller 210 may control the drain motor 630 to operate in a first mode (S810).

Next, the main controller 210 may determine whether the washing tub motor 230 is accelerated (S815), if yes, the main controller 210 may control the drain motor 630 to operate in a second mode (S820).

Next, the main controller 210 may determine whether the washing tub motor 230 rotates at a high speed (S825), if yes, the main controller 210 may control the drain motor 630 to operate in a third mode (S830).

For example, when the washing tub motor 230 exceeds a second reference speed Wb, the main controller 210 may determine that it is a high speed. For example, the second reference speed Wb may be 400 rpm.

Meanwhile, the first mode corresponds to a water level control mode, and the main controller 210 may control the drain motor 630 to rotate at a first speed W1, a second speed W2, and a third speed W3 lower than the second speed W2 before the washing tub motor 230 is accelerated.

In particular, the main controller 210 may control the drain motor 630 to rotate at the first speed W1, the second speed W2, and the third speed W3 lower than the second speed W2 according to the water level in the washing tub. In this case, in the first mode, the drain motor 630 does not stop and may be continuously rotated.

Figure 14A:
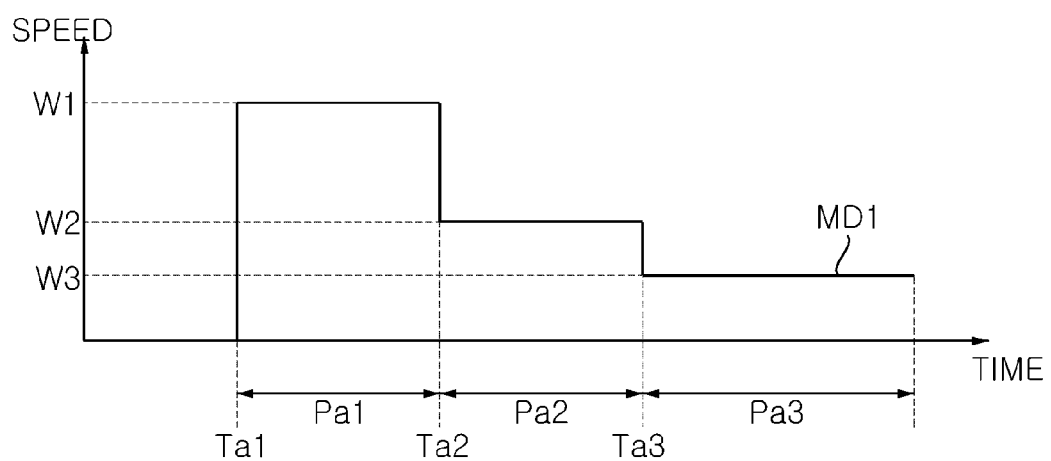

Meanwhile, when the washing tub water level decreases before the washing tub motor 230 is accelerated, the main controller 210 may control the drain motor to be gradually decreased to the first speed W1, the second speed W2, and the third speed W3, as illustrated in FIG. 14A according to the water level in the washing tub.

Figure 13:
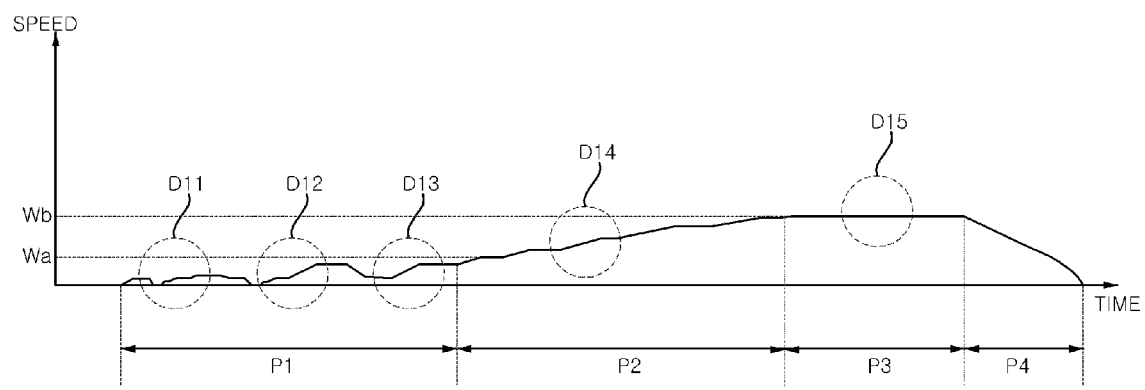

FIG. 13 illustrates that the washing tub motor 230 operates in a P1 section as a low speed section, a p2 section as an acceleration section, a p3 section as a high speed section, and a P4 section as a deceleration section.

The water level in the washing tub 120 decreases during dewatering as it goes to a D11 period, a D12 period, and a D13 period in the P1 period.

Accordingly, the main controller 210 may perform control such that, in the period D11 in the P1 section, the drain motor 630 rotates at the first speed W1 in FIG. 14A, in the period D12 in the section P1, the drain motor 630 is at the second speed W2 in FIG. 14A, and in the period D13 in the section P1, the drain motor 630 rotates at the third speed W3 in FIG. 14A. Accordingly, according to the operation of the washing tub motor 230, it is possible to efficiently drive the drain motor 630.

Meanwhile, in the section P1 as a low speed section, as a section in which the wash water is well introduced into the washing tub, as illustrated in FIG. 10B, the wash water WAT flowing into the vortex chamber ROOM of the drain pump 141 becomes full.

Figure 14B:
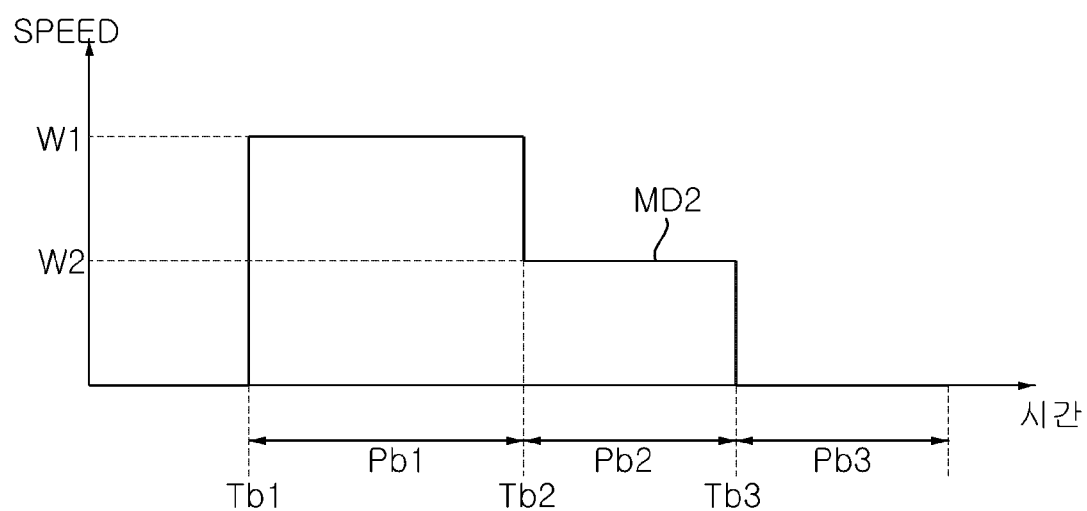

Next, the main controller 210 may perform control such that the drain motor 630 rotates at the first speed W1, as a second mode, when the washing tub motor 230 is accelerated and then the drain motor 630 rotates at the second speed W2 after a predetermined time, as illustrated in FIG. 14B. The second mode at this time may be referred to as an on control mode.

In particular, when the washing tub motor 230 is accelerated, the main controller 210 may control the drain motor 630 to operate at the first speed W1, the second speed W2 lower than the first speed W1, and a stop, as illustrated in FIG. 14B.

When the washing tub motor 230 is accelerated, only a part of the wash water WAT flowing into the vortex chamber ROOM of the drain pump 141 is introduced, as illustrated in FIG. 10A. Thus, the pressure state inside the vortex chamber ROOM increases.

Accordingly, in order to reduce the pressure in the vortex chamber ROOM of the drain pump 141, when the washing tub motor 230 is accelerated, the main controller 210 may control the drain motor 630 to operate at the first speed W1, the second speed W2 lower than the first speed W1, and the stop, as illustrated in FIG. 14B.

Meanwhile, in order to reduce the pressure in the vortex chamber ROOM of the drain pump 141, the main controller 210 may control the drain motor to operate at a stop after rotating at a constant speed.

In particular, the main controller 210 may control the drain motor 630 to rotate at the second speed W2 when the washing tub motor 230 is accelerated and then to stop when the water level in the washing tub is a zero water level.

Accordingly, while noise or vibration caused by the operation of the drain pump is reduced, drainage can be smoothly performed.

Meanwhile, when comparing the first mode and the second mode, in the first mode, since the speed of the drain motor 630 is different according to the water level in the washing tub, it is preferable that the type of speed in the first mode is greater than the type of speed in the second mode. Accordingly, according to the operation of the washing tub motor, it is possible to efficiently drive the drain motor.

Figure 14C:
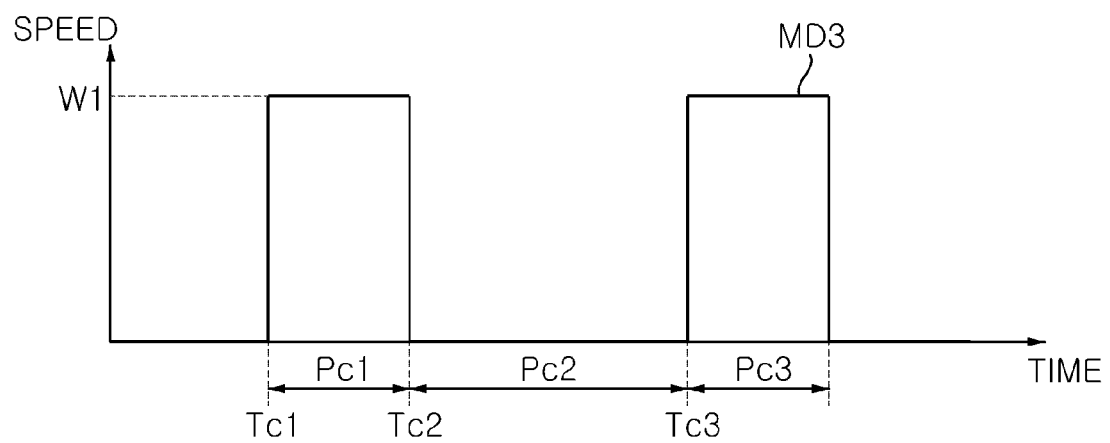

After the acceleration of the washing tub motor 230, the main controller 210 may perform control such that the drain motor 630 repeatedly turns on and off as the third mode, as illustrated in FIG. 14C. The third mode at this time may be referred to as a time control mode. Accordingly, according to the operation of the washing tub motor, while efficiently driving the drain motor, drainage can be smoothly performed.

Meanwhile, FIG. 1 illustrates a top loading type machine as a laundry treatment machine, but the drain pump driving apparatus 620 according to an embodiment of the present disclosure may also be applied to a front loading type machine, that is, a drum type machine.

Meanwhile, the drain pump driving apparatus 620 according to an embodiment of the present disclosure may be applied to various machines such as dishwashers and air conditioners, in addition to the laundry treatment machine 100.

The drain pump driving apparatus and the laundry treatment machine including the same according to embodiments of the present disclosure are not limited to the configurations and methods of the above-described embodiments, and various modifications to the embodiments may be made by selectively combining all or some of the embodiments.

Meanwhile, a method for operating the drain pump driving apparatus and the laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:
   a washing tub;
   a washing tub motor to rotate the washing tub;
   a drain pump;
   a drain motor to operate the drain pump;
   a converter to output a direct current (DC) voltage;
   an inverter to convert the DC voltage from the converter into an alternating current (AC) voltage based on a switching operation and to output the converted AC voltage to the drain motor; and
   a controller configured to control the drain motor to operate at a first speed, a second speed less than the first speed, and a stop by changing a speed of the drain motor when the washing tub motor is accelerated,
   wherein the controller is configured to control the drain pump to gradually decrease the speed of the drain motor without stopping, before the washing tub motor is accelerated,
   wherein the controller controls the drain motor to rotate at the first speed, the second speed, and a third speed less than the first speed by changing the speed of the drain motor, before the washing tub motor is accelerated,
   wherein an amount of wash water flowing into the drain pump before the washing tub motor is accelerated is greater than an amount of wash water flowing into the drain pump when the washing tub motor is accelerated.

2. The laundry treatment machine of claim 1, wherein the controller controls the drain motor to rotate at the first speed when the washing tub motor is accelerated, and then to rotate at the second speed after a predetermined time.

3. The laundry treatment machine of claim 2, wherein the controller controls the drain motor to rotate at the second speed when the washing tub motor is accelerated and then to stop rotation of the drain motor when a water level in the washing tub is a zero water level.

4. The laundry treatment machine of claim 1, wherein, when a water level in the washing tub decreases before the washing tub motor is accelerated, the controller controls the drain motor to be gradually decreased to the first speed, the second speed, and the third speed.

5. The laundry treatment machine of claim 1, wherein, when a speed of the washing tub motor is less than a first reference speed before the washing tub motor is accelerated, the controller controls the drain motor to rotate at the first speed, the second speed, and the third speed less than the first speed.

6. The laundry treatment machine of claim 5, wherein the first reference speed corresponds to a speed at which laundry is attached to an inside of the washing tub by rotation of the washing tub.

7. The laundry treatment machine of claim 1, wherein, after the acceleration of the washing tub motor, the controller controls the drain motor to repeatedly turn on and off.

8. The laundry treatment machine of claim 7, wherein, when the speed of the washing tub motor exceeds a second reference speed after the acceleration of the washing tub motor, the controller controls the drain motor to repeatedly turn on and off.

9. The laundry treatment machine of claim 1, wherein the controller controls the drain motor to continuously rotate without stopping by changing the speed of the drain motor before the washing tub motor is accelerated during drainage.

10. The laundry treatment machine of claim 1, wherein the controller controls power supplied to the drain motor to be constant without decreasing over time when a water level of the washing tub decreases during drainage.

11. A laundry treatment machine comprising:
    a washing tub;
    a washing tub motor to rotate the washing tub;
    a drain pump;
    a drain motor to operate the drain pump;
    a converter to output a direct current (DC) voltage;
    an inverter to convert the DC voltage from the converter into an alternating current (AC) voltage based on a switching operation and to output the converted AC voltage to the drain motor; and
    a controller configured to control the drain motor to operate in a first mode operating at a plurality of speeds by changing a speed of the drain motor before the washing tub motor is accelerated, and to operate in a second mode operating at a plurality of speeds by changing the speed of the drain motor when the washing tub motor is accelerated,
    wherein a speed in the first mode is greater than a speed in the second mode,
    wherein the controller is configured to control the drain pump to gradually decrease the speed of the drain motor without stopping, before the washing tub motor is accelerated,
    wherein, after the acceleration of the washing tub motor, the controller controls the drain motor to operate in a third mode in which the drain pump is repeatedly turned on and off,
    wherein an amount of wash water flowing into the drain pump before the washing tub motor is accelerated is greater than an amount of wash water flowing into the drain pump when the washing tub motor is accelerated.

12. The laundry treatment machine of claim 11, wherein, when the washing tub motor is accelerated, the controller controls the drain motor to operate at a first speed, a second speed less than the first speed, and a stop.

13. The laundry treatment machine of claim 11, wherein the controller controls the drain motor to rotate at a first speed, a second speed, and a third speed less than the first speed by changing the speed of the drain motor, before the washing tub motor is accelerated.

14. The laundry treatment machine of claim 11, wherein the controller controls the drain motor to continuously rotate without stopping by changing the speed of the drain motor before the washing tub motor is accelerated during drainage.

15. The laundry treatment machine of claim 11, wherein the controller controls power supplied to the drain motor to be constant without decreasing over time when a water level of the washing tub decreases during drainage.

\* \* \* \* \*